Patented Sept. 19, 1939

2,173,386

UNITED STATES PATENT OFFICE 2,173,386

INSECTICIDE

Donald L. Vivian, Washington, D. C., assignor to Henry A. Wallace, Secretary of Agriculture of the United States of America, and his successors in office No Drawing. Application February 6, 1939, Serial No. 254,883

7 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

My invention relates to materials for destroying or checking the growth or multiplication of living organisms, whether plant or animal, which are economically injurious to man.

An object of my invention is to provide a material suitable for use as an insecticide.

Another object of my invention is to provide a material which is relatively non-toxic to man and domestic animals when taken by mouth and which can be used in place of lead arsenate and other arsenicals for destroying insects without leaving a harmful residue on fruits and vegetables.

I have found that organic compounds containing two benzene nuclei joined by the hydrazo linkage, —NH—NH—, and in which the nuclei are either both unsubstituted or in which any hydrogen of one nucleus is substituted by alkyl, alkoxy, or halogen, are effective in killing many species of insects. Additional compounds of this general class comprise the same hydrazobenzene nucleus in which any one of the ring hydrogens is substituted by an aryl, aralkyl, amino, acetamido, or nitro group. These materials may be applied either externally or internally, as by spraying or dusting, or as components of oil emulsion sprays. They may also be used as sprays with an effective wetting agent, such as a sulphonated oil, or be dissolved in an appropriate solvent, such as acetone, and the solution poured into water, thus being converted into a fine precipitate which may be applied directly to plants, or may be combined with a suitable wetting agent and then sprayed.

The materials described in this invention are non-injurious to delicate vegetation, and relatively non-toxic to warm-blooded animals, while at the same time they are as effective as lead arsenate and other commonly used insecticides against many species of insects.

One of the preferred compounds comprised in my invention is hydrazobenzene, which when applied as a dust with talc is very effective against the most resistant instars of the southern army worm, the cross-striped cabbage worm, the melon worm, and against many other insects, including the codling moth.

Another of the compounds comprised in my invention is p-bromohydrazobenzene, which likewise has proved toxic to the above-mentioned insects, as have also p-methylhydrazobenzene and p-ethoxyhydrazobenzene, two other compounds embraced in my invention.

It is to be understood that the above-mentioned compounds are used in the above disclosure merely as examples, and that this invention is not restricted by such use.

Having thus disclosed my invention, I claim:

1. An insecticide comprising a compound of the general formula:

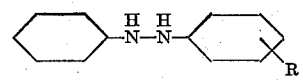

where R is a substituent chosen from the group consisting of hydrogen, methyl, ethoxy, and halogen.

2. An insecticide containing as its essential active ingredient hydrazobenzene.

3. An insecticide containing as its essential active ingredient p-bromohydrazobenzene.

4. An insecticide containing as its essential active ingredient p-chlorohydrazobenzene.

5. An insecticide containing as its essential active ingredient p-methylhydrazobenzene.

6. An insecticide containing as its essential active ingredient p-ethoxyhydrazobenzene.

7. An insecticide containing as its essential active ingredient p-iodohydrazobenzene.

DONALD L. VIVIAN.